United States Patent
Tse et al.

(10) Patent No.: US 8,396,377 B2
(45) Date of Patent: Mar. 12, 2013

(54) USING MULTIPLE INPUTS FROM MOBILE DEVICES TO REFINE PRINTING DEVICE LOCATION

(75) Inventors: Francis Kapo Tse, Rochester, NY (US); Armon Rahgozar, Fairport, NY (US); James M. A. Begole, Los Altos, CA (US); Hua Liu, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 349 days.

(21) Appl. No.: 12/829,564

(22) Filed: Jul. 2, 2010

(65) Prior Publication Data
US 2012/0002980 A1    Jan. 5, 2012

(51) Int. Cl.
G03G 15/00    (2006.01)
(52) U.S. Cl. .......................................... 399/8
(58) Field of Classification Search ............... 399/8, 12, 399/411; 455/456.1; 342/126, 386, 450
See application file for complete search history.

(56) References Cited

U.S. PATENT DOCUMENTS

| | | | |
|---|---|---|---|
| 6,032,004 A | 2/2000 | Mirabella, Jr. et al. | |
| 6,725,051 B2 | 4/2004 | Fidler | |
| 7,027,820 B2 | 4/2006 | Spratt | |
| 7,054,651 B2 * | 5/2006 | Ocke | 455/456.3 |
| 7,064,854 B2 * | 6/2006 | Idehara | 358/1.15 |
| 7,548,197 B2 | 6/2009 | Gruchala et al. | |
| 2003/0142016 A1 * | 7/2003 | Pickup | 342/387 |
| 2004/0204831 A1 | 10/2004 | Pochuev et al. | |
| 2010/0265286 A1 * | 10/2010 | Park et al. | 347/5 |

FOREIGN PATENT DOCUMENTS
JP    2003259079 A *  9/2003
JP    2005066875 A *  3/2005

* cited by examiner

*Primary Examiner* — Robert Beatty
(74) *Attorney, Agent, or Firm* — Gibb & Riley, LLC

(57) ABSTRACT

Methods and printing devices herein establish a current physical position of a printing device and then receive current physical position readings from different portable computing devices (when the portable computing devices or its users are physically interacting with the printing device). The portable computing devices each have a physical position locator. The method then processes the current physical position readings to refine the current physical position of the printing device.

20 Claims, 3 Drawing Sheets

USING MULTIPLE INPUTS FROM MOBILE DEVICES TO REFINE PRINTING DEVICE LOCATION

BACKGROUND

Embodiments herein generally relate to printing devices and more particularly to printing devices that are location-aware or that are equipped with location information that can be manually or automatically entered, and to systems and methods for establishing and refining the physical position of such printing devices.

As mobile printing and location-aware portable devices, such as smart phones, become more prevalent, it is desirable to be able to find unfamiliar printers and multi-function printing devices (MFDs) as the location information of these printing devices (that is stored along with the name, internet-protocol (IP) address and other forms of identification of the printing device) become more widely available.

While printing devices are generally not mobile devices (although they can be relocated occasionally) it is becoming more common for such devices to contain location information (which can be a street location, a latitude-longitude location, internal building location, etc). Such location information is utilized by the portable computing devices to identify the closest printing device when the portable computing device needs to perform a print job.

While most printer/multi-function printing devices do not have a built in GPS, when the printing device is initially placed in a certain the location coordinates can be estimated (using an external GPS device) and stored within the printing device. However, due to the signal strength of GPS signals, especially within a building, only rough location estimates can be made in a single measurement.

SUMMARY

The embodiments herein take advantage of the situation where a walkup user (with a location aware mobile device that might have a more capable and/or up to date location detection hardware/firmware/software) could interact with a location registered printing device. Such a walkup user could have their mobile device communicate with the printing device for automatic authentication, to release jobs, to specify scan instructions, etc. The embodiments herein have each such mobile device estimate its location, and have the mobile device input such location information (potentially along with a location information confidence measure) to the printing device each time each mobile computing device interacts with the printing devices. This accumulated estimation helps (over time) provide much better location coordinates for a location-registered printing device.

One exemplary method herein establishes a current physical position of a printing device and then receives current physical position readings from different portable computing devices (when the portable computing devices or its users are physically interacting with the printing device, such as scanning a job release QR code on the mobile computing device, keying in a confirmation code on the local UI to validate mobile computing device identity or using the mobile computing device to enter scan parameters). The portable computing devices each have a physical position locator, such as a global physical positioning system (GPS) receiver, a land-based receiver, a cell phone based triangulation receiver, a wireless-fidelity (WiFi) receiver, etc. To perform this, the printing device can request the current physical position readings from the portable computing devices (again, when the portable computing devices or its user is physically interacting with the printing device).

The method then processes (e.g., performs statistical operations on) the current physical position readings to refine the current physical position of the printing device. Such current physical position readings can be received wirelessly by the printing device or as part of the image displayed on a portable computing device that would be scanned by the printing device.

Another exemplary embodiment herein establishes a current physical position of a printing device, using features of the printing device. After establishing the current physical position of the printing device, the printing device receives instructions to perform printing operations from the different portable computing devices. Again, the portable computing devices each have a physical position locator that determines a corresponding current physical position of each of the portable computing devices.

The printing device thus receives the current physical position readings from the portable computing devices. More specifically, each individual current physical position reading is received from each corresponding portable computing device when each corresponding portable computing device is within the predetermined distance of the printing device. One or more of the individual current physical position readings can include a positional confidence measure. Then, when processing the individual current physical position readings, the printing device weights each individual current physical position reading by the positional confidence measure to refine the current physical position of the printing device.

Another exemplary embodiment herein is a printing device that includes, a processor, a printing engine operatively connected (directly or indirectly connected) to the processor, a data input/output operatively connected to the processor, and a wireless transceiver operatively connected to the processor. The processor establishes the current physical position of the printing device, using the data input/output.

After establishing the current physical position of the printing device, the processor receives, through the wireless transceiver, instructions for the printing device to perform printing operations (using the printing engine) from different portable computing devices. Again, the portable computing devices each have a physical position locator that determines a corresponding current physical position of each of the portable computing devices.

The processor also receives, through the wireless transceiver, current physical position readings from the portable computing devices. Again, each individual current physical position reading is received from each corresponding portable computing device of the portable computing devices when the corresponding portable computing device is within a predetermined distance of the printing device. The processor processes each individual current physical position reading to refine the current physical position of the printing device.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, there are many reasons why it is beneficial to have location coordinate information available for installed printing devices. As mobile printing becomes more widely used, the need to locate unfamiliar printers and printing devices is met by identifying such devices with location-enabled mobile phones, and portable digital assistants (PDAs). Nearby printers and printing devices can be identified by such portable computing devices if the printer's location information is stored along with its name, IP address and other forms of identification.

While providing rough GPS location information for a printer or multi-function printing devices is useful to determine which building or which part of the building in which the printers are located, it is understandably more desirable to refine the location as much as possible. With the embodiments herein, as more and more portable computing devices communicate with the printing device, its physical location is continuously refined. Also, as technology for location detection on portable computing devices is improved, the printers or multifunction printing devices will benefit from the improved technology indirectly.

GPS-based location estimation is not extremely accurate indoors (although near a window it can be fairly accurate). Wireless-fidelity (WiFi) based location technologies, cell-tower technologies, and other similar technologies sometimes work very well indoors, but also can be inaccurate.

Each of the different technologies only provides estimates of the printing device's location; however, with the embodiments herein, by obtaining positional information from multiple different devices (each of which may rely upon a different and/or more advanced technology for determining its position a location) the physical location of the printing device is continually refined and improved.

Figure 1:
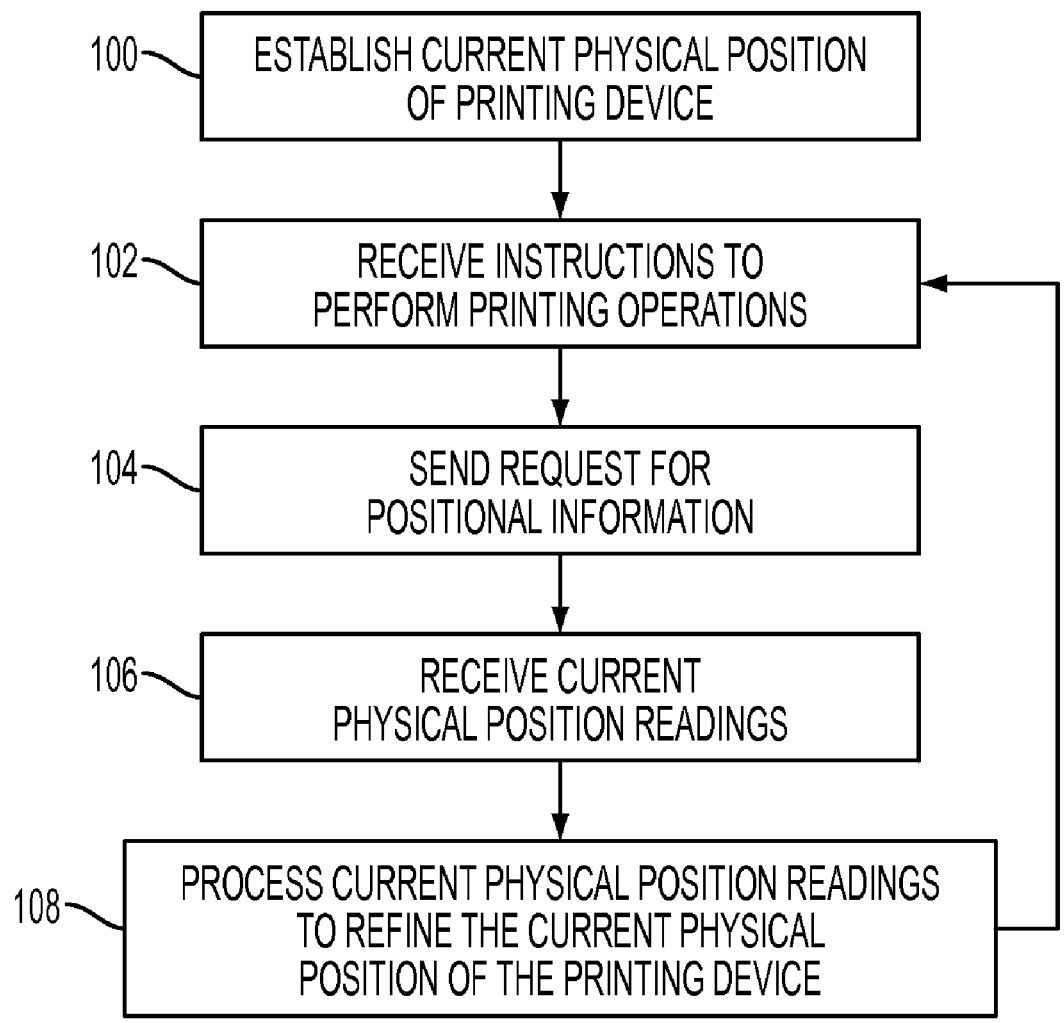
FIG. 1 is a flow diagram of a method according to embodiments herein.

The embodiments herein help to continually refine the identification of the physical position of a printing device by receiving continual inputs from many different portable computing devices. More specifically, as shown in flowchart form in FIG. 1, one embodiment herein establishes a current physical position of a printing device in item 100. This step can be performed, for example, when the printing device is initially installed in its permanent (or semi-permanent) location.

In item 102, after establishing the current physical position of the printing device, in its normal operation, the printing device will receive instructions to perform printing operations from many different portable computing devices that would require a physical interaction such as keying info on a local user interface (UI), scanning in a query record (QR) code, etc. The portable computing devices each have a physical position locator, such as a global physical positioning system (GPS) receiver, a land-based receiver, a cell phone based triangulation receiver, a wireless-fidelity (WiFi) receiver, etc.

Therefore, as shown in item 104, the embodiments herein send a request from the printing device to the portable computing device for transmission of positional information. Then, in item 106, this embodiment receives the current physical position readings from different portable computing devices.

Just from the fact that the portable computing device is interacting with the printing device, it can be assumed that the portable computing device is in the general physical location of the printing device. Alternatively, the embodiments herein can operate in a number of different ways to make sure that the current physical physician readings obtained from the portable computing devices are obtained when the portable computing devices are in close physical proximity to the printing device. For example, the embodiments herein can limit their requests for positional information to times when the user is physically interacting with (touching) the printing device by inputting commands into the user interface of the printing device, or when a barcode or glyph is being scanned from the portable computing device into the scanner of printing device. Alternatively, the embodiments herein can limit their requests for positional information to times when the distance between the printing device and the portable computing device can be determined in some manner. For example, the distance between the portable computing device and the printing device can be determined manually (by presenting a distance question to the user). Also, the distance between the portable computing device and printing device can be determined automatically according to the strength of an infrared communication signal, strength of the Bluetooth signal, strength of the WiFi signal, etc.

Therefore, for example, the printing device may only accept current physical position readings from the portable computing devices when they are within 25 feet, 10 feet, 3 feet, etc., of the printing device. Alternatively, the physical position readings can be weighted according to how close the portable computing device is to the printing device when the positional readings obtained. Those readings that are obtained when the portable computing devices are closer to the printing device will receive a higher weighting than those that are further away.

In item 108, the method then processes (e.g., performs statistical operations on) the current physical position readings to refine the current physical position of the printing device. As shown by the arrow from item 108 to item 100, the processing loops back to receive more printing instructions and repeat the refinement process when another print operation is initiated.

Further, the embodiments herein also provide a mechanism to accommodate or adjust for errors in location detection. GPS coordinates come with a PDOP (Position Dilution Of Precision) metric, which is an indication of the accuracy of the positional reading. Other location technologies can also include similar confidence measures that are associated with their estimation location of the portable computing device.

Thus, in item 106, one or more of the individual current physical position readings can include a positional confidence measure. Then, when processing the individual current physical position readings in item 108, the printing device weights each individual current physical position reading by the positional confidence measure to refine the current physical position of the printing device.

In item 108, some embodiments herein can refine the position of the printing device by taking an average (or performance other statistical calculations, such as mean, standard deviation, etc.) of all positions received from the different portable computing devices that may supply it with positional information. Other embodiments herein use the physical position readings weighed by the confidence measure of the positional information. Therefore, rather than just taking a single reading to establish (or reestablish) the position of the printing device, the embodiments herein take an average (or some other statistical measure) of all readings that are received. These readings can also be weighted according to a number of different parameters (GPS confidence, positional distance between the portable computing device in the printing device, etc.). Therefore, with embodiments herein, rather than being constantly changed with each new positional reading, the position of the printer is merely refined by each new positional reading from each new interaction with a portable computing device. This allows the embodiments herein to utilize the positional history of multiple portable computing devices that have interacted with the printing device to continually refine and adjust the position of the portable computing device. Either the printing devices or a device manager server performs the necessary calculations to refine the location estimation of the printing device.

Figure 2:
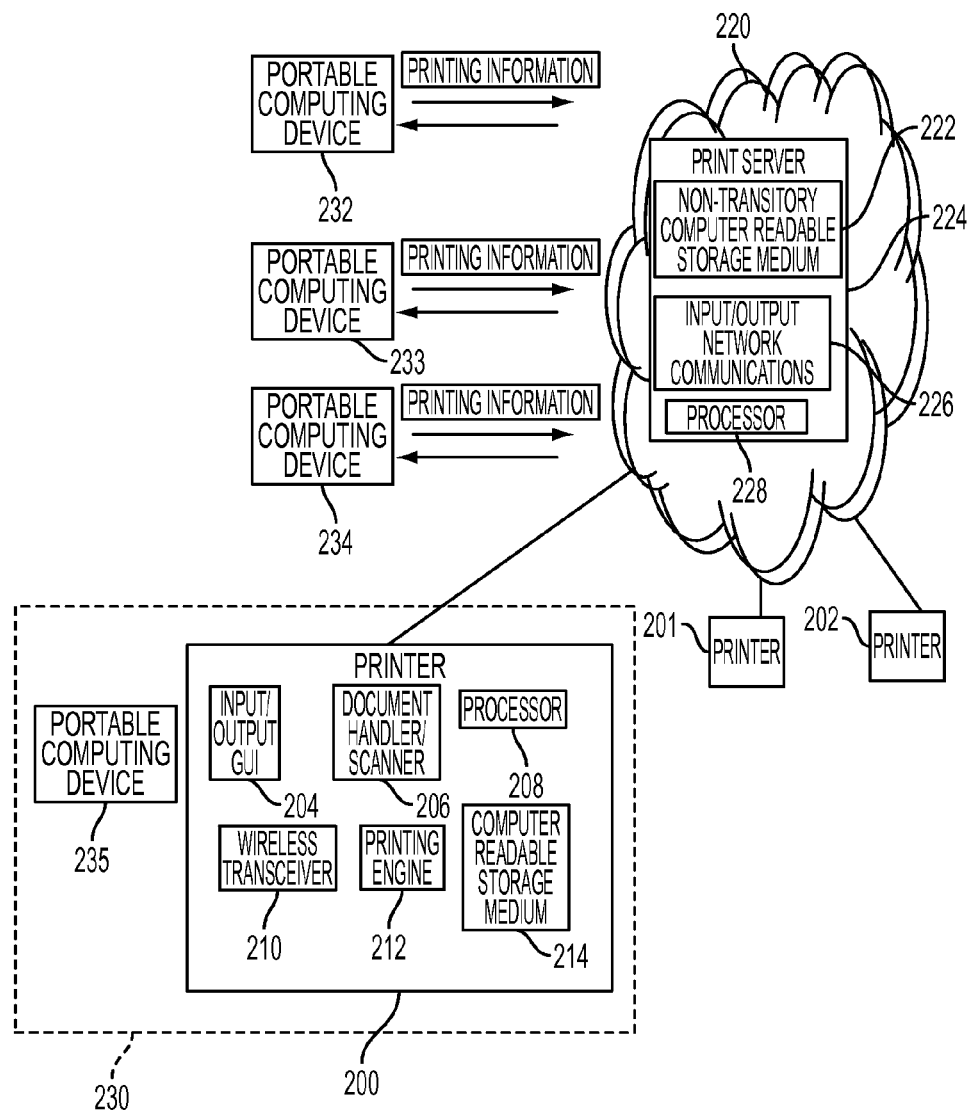
FIG. 2 is a schematic diagram of a system according to embodiments herein.

Another exemplary embodiment, shown in FIG. 2, is a system of various (identifier or different) portable computing devices 232-234 operatively connected to (directly or indirectly connected to) and in communication with some form of network 200 (which can be a local area network, wide area network, cloud computing network, etc.). Again, the portable computing devices 232-234 can comprise any commonly available device including, cell phones, PDAs, smart phones, portable computers, etc.

At least one print server 224 is within the network 200. The exemplary print server 224 can include a non-transitory computer readable storage medium 222 such as a hard disk, a random access memory (RAM), a read-only memory (ROM), flash memory, an optical storage device, a magnetic storage device, etc., as well as input/output network communications devices 226 and a processor 228. The network communication devices 226 can be any appropriate wired or wireless device that is used with the network 200. Similarly, the processor 236 can comprise any well-known processor, such as those available from Intel Corp., Santa Clara, Calif.

The various printing devices 200-202 are also operatively connected to, and in communication with the network 200. One of the printing devices 200 is shown in greater detail in FIG. 2. This printing device 200 includes an input/output GUI (graphic user interface) 204 a document handler/scanner 206, a processor 208 (similar to the processor discussed above) the wireless transceiver 210, a printing engine 212, and a computer readable storage medium 214 (similar to the computer storage discussed above). All the components within the printer 200 are operatively connected to one another, although not all connections are shown in order to avoid clutter within the drawings.

The processor 208 can establish the current physical position of the printing device 200, using the data input/output GUI 204, for example when the printing device 200 is initially installed in a certain location. After establishing the physical position of the printing device 200, the processor 208 receives, through the input/output 204 or the wireless transceiver 208, instructions for the printing device 200 to perform printing operations (using the printing engine 212) from one of the portable computing devices 235. Again, the portable computing devices 232-235 each have a physical position locator that determines a corresponding current physical position of each of the portable computing devices 232-235.

The processor 208 also receives, through the input/output GUI 204, the scanner 206, the wireless transceiver 210 etc.), current physical position readings from the portable computing devices 232-235. Again, each individual current physical position reading is received from each corresponding portable computing device when each corresponding portable computing device is within a predetermined distance (represented by dotted box 230 in FIG. 2) of the printing device 200. In FIG. 2, portable computing device 235 is illustrated as being within the "predetermined distance" 230 of the printing device 200 and is therefore in no position to provide the printing device 200 with a current physical position reading. As mentioned above, the processor 208 processes each individual current physical position reading to refine the current physical position of the printing device 200.

Figure 3:
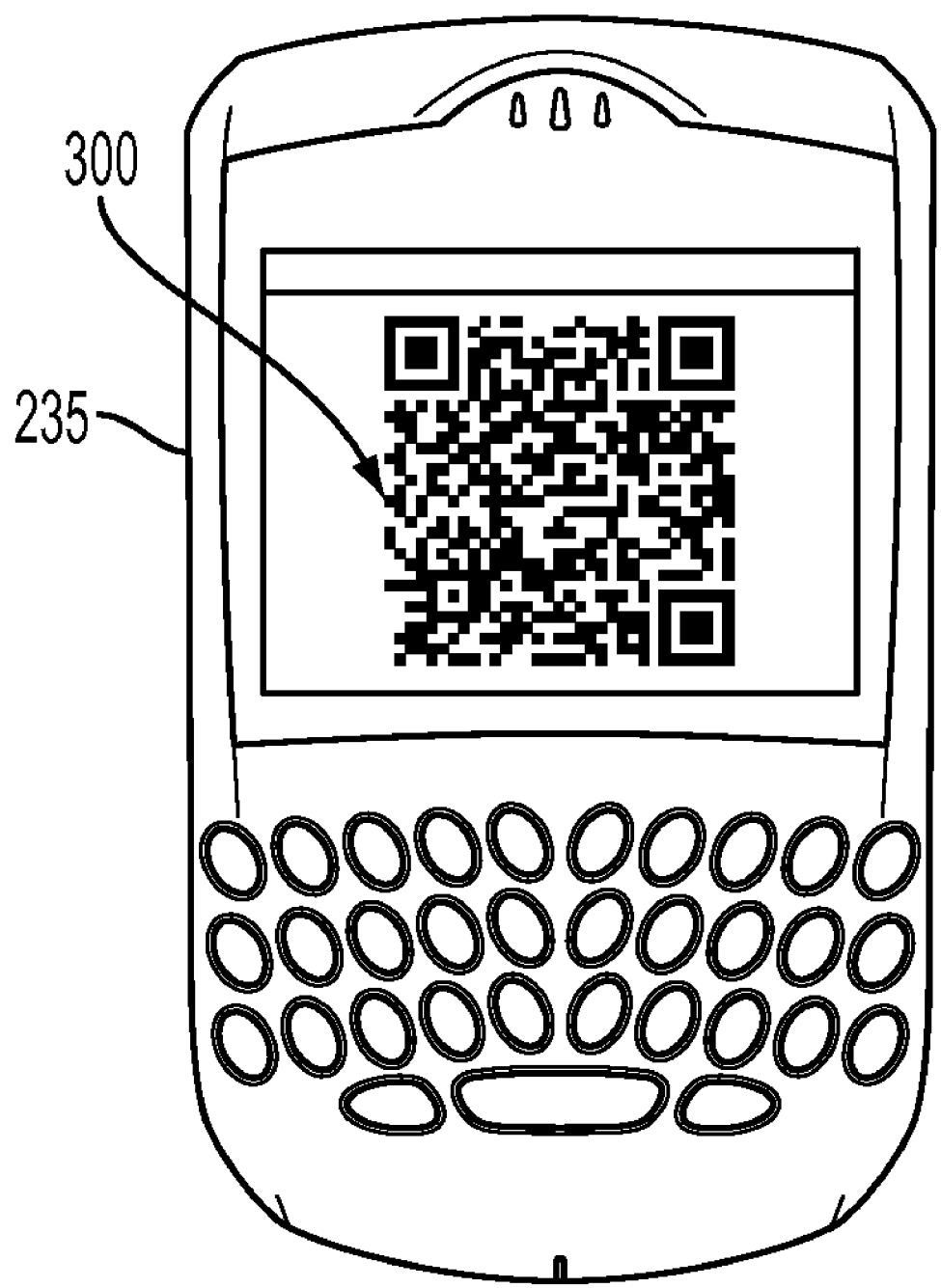
FIG. 3 is a schematic diagram of a device according to embodiments herein.

With the embodiments herein the positional information obtained by the location-aware external device 235 is transferred to the location-aware printing device 200, in item 106, through the wired/wireless connection 204, 210, an infrared (IR) connection 210, or by having the printing device scanner 206 scan a barcode or glyph image displayed by the portable computing device. FIG. 3 illustrates an exemplary portable computing device 235 displaying a barcode or glyph 300 thereon.

In FIG. 3, a barcode or glyph 300 contains the current physical position reading embedded within the code needed for the user to release a print job. With the embodiments herein, the user would be instructed (either through the graphic user interface 204 of the printing device 200 or the graphic user interface of the portable computing device 235) to place the portable computing device 235 on the platen or scanner 206 of the printing device 200 in order to release a print job and at the same time allow the current physical position reading to be transferred to the printing device 200.

Therefore, the embodiments herein utilize some of the capabilities of the various location enabled mobile devices that interact with the printing devices. The embodiments herein provide an effective and convenient way to improve the location coordinate information for a printing device to assist mobile printing customers in their quest for more accurate locations of available printing devices.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, physical position, size, shape, angle, color, or material.

What is claimed is:

1. A method comprising:
    establishing a current physical position of a printing device, using said printing device;
    receiving, by said printing device, a plurality of current physical position readings from a plurality of different portable computing devices when said portable computing devices interact with said printing device, said portable computing devices each having a physical position locator; and
    processing said current physical position readings, using said printing device, to produce a refined physical position of said printing device based on a statistical calculation based on said current physical position and said plurality of current physical position readings from said plurality of different portable computing devices.

2. The method according to claim 1, further comprising requesting said current physical position readings from said portable computing devices when said portable computing devices or its users are physically interacting with said printing device.

3. The method according to claim 1, said current physical position readings being received wirelessly by said printing device.

4. The method according to claim 1, said physical position locator comprising at least one of:
    a global physical positioning system (GPS) receiver;
    a land-based receiver;
    a cell phone based triangulation receiver; and
    a wireless-fidelity (WiFi) receiver.

5. The method according to claim 1, said refined physical position being different than a most recent new positional reading of said plurality of current physical position readings.

6. A method comprising:
    establishing a current physical position of a printing device, using said printing device;
    after establishing said current physical position of said printing device, receiving, by said printing device, a plurality of instructions for said printing device to perform a plurality of printing operations from a plurality of different portable computing devices, said portable computing devices each having a physical position locator that determines a corresponding current physical position of each of said portable computing devices;
    receiving, by said printing device, a plurality of current physical position readings from said portable computing devices, each individual current physical position reading of said current physical position readings being received from each corresponding portable computing device of said portable computing devices when said corresponding portable computing device interacts said printing device; and
    processing each said individual current physical position reading, using said printing device, to produce a refined physical position of said printing device based on a statistical calculation based on said current physical position and said plurality of current physical position readings from said plurality of different portable computing devices.

7. The method according to claim 6, further comprising requesting said individual current physical position reading from said corresponding portable computing device when said corresponding portable computing device or its user is physically interacting with said printing device.

8. The method according to claim 6, said current physical position readings being received wirelessly by said printing device.

9. The method according to claim 6, said physical position locator comprising at least one of:
    a global physical positioning system (GPS) receiver;
    a land-based receiver;
    a cell phone based triangulation receiver; and
    a wireless-fidelity (WiFi) receiver.

10. The method according to claim 6, said refined physical position being different than a most recent new positional reading of said plurality of current physical position readings.

11. A method comprising:
    establishing a current physical position of a printing device, using said printing device;
    after establishing said current physical position of said printing device, receiving, by said printing device, a plurality of instructions for said printing device to perform a plurality of printing operations from a plurality of different portable computing devices, said portable computing devices each having a physical position locator that determines a corresponding current physical position of each of said portable computing devices;
    receiving, by said printing device, a plurality of current physical position readings from said portable computing devices, each individual current physical position reading of said current physical position readings being received from each corresponding portable computing device of said portable computing devices when said corresponding portable computing device is within a predetermined distance of and is interacting with said printing device, at least one of said individual current physical position readings including a positional confidence measure; and
    processing each said individual current physical position reading by weighting each said individual current physical position reading by said positional confidence measure, using said printing device, to produce a refined physical position of said printing device based on a statistical calculation based on said current physical position and said plurality of current physical position readings from said plurality of different portable computing devices.

12. The method according to claim 11, further comprising requesting said individual current physical position reading from said corresponding portable computing device when said corresponding portable computing device or its user is physically interacting with said printing device.

13. The method according to claim 11, said current physical position readings being received wirelessly by said printing device.

14. The method according to claim 11, said physical position locator comprising at least one of:
    a global physical positioning system (GPS) receiver;
    a land-based receiver;
    a cell phone based triangulation receiver; and
    a wireless-fidelity (WiFi) receiver.

15. The method according to claim 11, said refined physical position being different than a most recent new positional reading of said plurality of current physical position readings.

16. A printing device comprising:
    a processor;
    a printing engine operatively connected to said processor;
    a data input/output operatively connected to said processor; and a wireless transceiver operatively connected to said processor, said processor establishing a current physical position of said printing device, using said data input/output, after establishing said current physical position of said printing device, said processor receiving, through said wireless transceiver, a plurality of instructions for said printing device to perform a plurality of printing operations using said printing engine from a plurality of different portable computing devices, said portable computing devices each having a physical position locator that determines a corresponding current physical position of each of said portable computing devices, said processor receiving, through said wireless transceiver, a plurality of current physical position readings from said portable computing devices, each individual current physical position reading of said current physical position readings being received from each corresponding portable computing device of said portable computing devices when said corresponding portable computing device interacts with said printing device, and said processor processing each said individual current physical position reading to produce a refined physical position of said printing device based on a statistical calculation based on said current physical position and said plurality of current physical position readings from said plurality of different portable computing devices.

17. The printing device according to claim 16, said processor causing said wireless transceiver to request said individual current physical position reading from said corresponding portable computing device when said corresponding portable computing device or its user is physically interacting with said printing device.

18. The printing device according to claim 16, said physical position locator comprising at least one of:
  a global physical positioning system (GPS) receiver;
  a land-based receiver;
  a cell phone based triangulation receiver; and
  a wireless-fidelity (WiFi) receiver.

19. The printing device according to claim 16, said printing engine comprising one of an electrostatic and xerographic printing engine.

20. The printing device according to claim 16, said refined physical position being different than a most recent new positional reading of said plurality of current physical position readings.

* * * * *